US012646861B2

(12) United States Patent
Lin et al.

(10) Patent No.: US 12,646,861 B2
(45) Date of Patent: Jun. 2, 2026

(54) MULTIPORT ANTENNA, MULTIPORT ANTENNA SYSTEM, AND METHODS OF OPERATION

(71) Applicant: Epirus, Inc., Torrance, CA (US)

(72) Inventors: Han Wen Lin, Torrance, CA (US); Denpol Kultran, Torrance, CA (US); Amrita Bal, Fullerton, CA (US); Nafati Aboserwal, Harbor City, CA (US)

( * ) Notice: Subject to any disclaimer, the term of this patent is extended or adjusted under 35 U.S.C. 154(b) by 79 days.

(21) Appl. No.: 18/424,603

(22) Filed: Jan. 26, 2024

(65) Prior Publication Data

US 2024/0258714 A1 Aug. 1, 2024

Related U.S. Application Data

(63) Continuation of application No. PCT/US2024/012971, filed on Jan. 25, 2024.

(60) Provisional application No. 63/441,564, filed on Jan. 27, 2023.

(51) Int. Cl.
*H01Q 21/26* (2006.01)
*H01Q 9/28* (2006.01)

(52) U.S. Cl.
CPC ............. *H01Q 21/26* (2013.01); *H01Q 9/285* (2013.01)

(58) Field of Classification Search
CPC ....... H01Q 21/26; H01Q 9/285; H01Q 21/065
See application file for complete search history.

(56) References Cited

U.S. PATENT DOCUMENTS

| | | | | |
|---|---|---|---|---|
| 4,649,391 | A * | 3/1987 | Tsuda | H01Q 25/02 343/789 |
| 6,184,828 | B1 | 2/2001 | Shoki | |
| 9,316,723 | B2 | 4/2016 | Tayrani et al. | |
| 9,705,611 | B1 | 7/2017 | West | |
| 9,929,886 | B2 | 3/2018 | Amadjikpe et al. | |
| 10,971,815 | B1 | 4/2021 | West et al. | |
| 11,211,703 | B2 | 12/2021 | Marr et al. | |
| 11,506,773 | B1 * | 11/2022 | Everett | G01S 7/03 |
| 11,509,070 | B2 | 11/2022 | Corman et al. | |

(Continued)

FOREIGN PATENT DOCUMENTS

| | | |
|---|---|---|
| EP | 3370306 A1 | 9/2018 |
| EP | 3136504 A1 | 6/2022 |

(Continued)

OTHER PUBLICATIONS

International Search Report and Written Opinion received in International Application No. PCT/US2024/012971, dated May 16, 2024, in 25 pages.

(Continued)

*Primary Examiner* — Hai V Tran
(74) *Attorney, Agent, or Firm* — Knobbe, Martens, Olson & Bear, LLP

(57) ABSTRACT

A system comprising an electronic system comprising a plurality of solid state radio frequency (RF) amplifiers and an antenna structure. The antenna structure includes a dielectric substrate and a plurality of antenna elements extending along the dielectric substrate. The antenna structure further includes a plurality of feedlines each of which is coupled to an individual antenna element of the plurality of antenna elements. An output of each of the plurality of solid state RF amplifiers is coupled an individual feedline of the plurality of feedlines.

22 Claims, 8 Drawing Sheets

(56) References Cited

U.S. PATENT DOCUMENTS

| | | | | |
|---|---|---|---|---|
| 11,616,295 | B2 | 3/2023 | Marr et al. | |
| 11,658,410 | B2 | 5/2023 | So et al. | |
| 12,429,312 | B2 | 9/2025 | Dower et al. | |
| 2006/0125687 | A1 | 6/2006 | Greeley | |
| 2009/0009399 | A1* | 1/2009 | Gaucher | H01Q 21/0075 343/700 MS |
| 2015/0070217 | A1 | 3/2015 | Sharawi et al. | |
| 2020/0212590 | A1 | 7/2020 | Rofougaran et al. | |
| 2020/0287298 | A1* | 9/2020 | Ueda | H01Q 9/0407 |
| 2020/0295463 | A1* | 9/2020 | Yamada | H01Q 21/0025 |
| 2021/0344118 | A1 | 11/2021 | Cho et al. | |
| 2022/0337307 | A1 | 10/2022 | Yu et al. | |
| 2022/0407233 | A1* | 12/2022 | Woo | H04B 7/0617 |
| 2023/0024815 | A1* | 1/2023 | Jervis | H01Q 21/30 |
| 2024/0055767 | A1* | 2/2024 | Yi | H01Q 15/08 |
| 2024/0106106 | A1* | 3/2024 | Gouchi | H01Q 21/24 |

FOREIGN PATENT DOCUMENTS

| | | | |
|---|---|---|---|
| EP | 4120511 | A1 | 1/2023 |
| WO | WO 2017/141232 | A1 | 8/2017 |
| WO | WO 2018/119153 | A2 | 6/2018 |
| WO | WO 2019/133195 | A1 | 7/2019 |
| WO | WO 2021/096889 | A1 | 5/2021 |
| WO | WO 2022/098115 | A1 | 5/2022 |
| WO | WO 2022/197162 | A1 | 9/2022 |
| WO | WO 2023/091179 | | 5/2023 |
| WO | WO 2024/159027 | | 8/2024 |

OTHER PUBLICATIONS

Bowers et al., "An integrated slot-ring travling-wave radiator", IEEE Transactions on Microwave Theory and Techniques, vol. 63(4):1154-1162 (2015).

Bowers et al., "Multi-port driven radiators", IEEE Transactions on Microwave Theory and Techniques, vol. 61(12):4428-4441 (2013).

Chi et al., "A multifeed antenna for high-efficiency on-antenna power combining", IEEE Transactions on Antennas and Propoagation, vol. 65(12):6937-6951 (2017).

Iupikov et al., "A cavity-backed patch antenna with distributed multi-port feeding, enabling efficient integration with doherty power amplifier and band-pass filter", IEEE Transactions on Antennas and Propagation, vol. 69(8):4412-4422 (2021).

Kuznetcov et al., "Dual-polarized antenna with dual-differential integrated feeding for wideband full-duplex systems", IEEE Transactions on Antennas and Propogation, vol. 69(11):7192-7201 (2021).

Wen et al., "A low-cost differentially driven dual-polarized patch antenna by using open loop resonators", IEEE Transactions on Antennas and Propogation, DOI 10.1109/TAP.2019.2896491, pp. 1-6 (2019).

Yen et al., "Co-circulatly polarized van atta array enable by quasi-monostatic STAR antennas", IEEE Transactions on Antennas and Propoagation, vol. 69(11):7156-7165 (2021).

Zhou et al., "Mutual coupling reduction in dual differntial-fed 2x1 phased array with polarization and pattern diversity", IEEE International Symposium on Antennas and Propogation and USNC-URSI Radio Science Meeting, DOI: 10.1109/APS/URSI47566.2021.9704461, pp. 919-920, downloaded on Jul. 11, 2022.

International Preliminary Report on Patentability and Written Opinion in application No. PCT/US2024/012971, dated Jul. 22, 2025, in 12 pages.

* cited by examiner

MULTIPORT ANTENNA, MULTIPORT ANTENNA SYSTEM, AND METHODS OF OPERATION

CROSS-REFERENCE TO RELATED APPLICATIONS

This application is a continuation of International Application No. PCT/US2024/012971, filed on Jan. 25, 2024, which claims benefit of priority of U.S. Provisional Patent Application No. 63/441,564, filed on Jan. 27, 2023. The entire contents each of the above-identified application are incorporated by reference herein.

TECHNICAL FIELD

The present disclosure relates to antennas, systems including antennas, and methods of operation thereof.

BACKGROUND

Generation of high-power radio frequency electromagnetic radiation is becoming increasingly valuable in communications and other applications. However, increasing the power of electromagnetic radiation emitted by antennas can result in a difficult balance of design considerations. One conventional approach, binary tree combining, involves combining signals using power couplers in one or more stages and outputting the combined signals via a single antenna element. Besides increasing size and weight of the system, each stage of power combining results in loss of overall signal strength. Moreover, some conventional approaches sacrifice system agility in certain domains, such as phased arrays.

SUMMARY

Disclosed herein are novel aspects of antenna structures, electronic systems coupled thereto, and phased array systems. Systems disclosed herein can include an electronic system comprising a plurality of solid state radio frequency (RF) amplifiers; an antenna structure including a dielectric substrate, a plurality of antenna elements extending along the dielectric substrate, and a plurality of feedlines each of which is coupled to an individual antenna element of the plurality of antenna elements wherein an output of each of the plurality of solid state RF amplifiers is coupled an individual feedline of the plurality of feedlines.

The plurality of antenna elements can include a first pair of antenna elements extending in opposite first directions, and a second pair of antenna elements extending in opposite second directions, the second pair of antenna elements being arranged transversely to the first pair of antenna elements. The plurality of antenna elements can be bowtie antenna elements. The antenna structure can include a planar antenna element on a first side of the dielectric substrate, and a ground plane on a second side of the dielectric substrate opposite to the first side, the first pair of antenna elements and the second pair of antenna elements being located within the dielectric substrate between the planar antenna element and the ground plane.

The electronic system can be configured to receive a radio frequency (RF) signal; split the RF signal into a plurality of RF signals; and phase shift a subset of RF signals of the plurality of RF signals, wherein the solid state RF amplifiers amplify the plurality of RF signals.

The electronic system can include a phase shifter configured to selectively transition between a first state and a second state, the first state corresponding to a first polarization of high-power microwaves emitted by the antenna structure, and the second state corresponding to a second polarization of high-power microwaves emitted by the antenna structure. The phase shifter can be configured to selectively transition between a third state and a fourth state, the third state corresponding to a third polarization of high-power microwaves emitted by the antenna structure, and the fourth state corresponding to a fourth polarization of high-power microwaves emitted by the antenna structure.

Implementations of the present disclosure include systems can include an electronic system configured to receive an RF signal, the electronic system including a first hybrid coupler that splits the RF signal into a first signal and a second signal, the second signal phase-shifted relative to the first signal; a first set of transmission paths including a second hybrid coupler and a first set of RF amplifiers of a plurality of RF amplifiers; and a second set of transmission paths including a third hybrid coupler, a first phase shifter, and a second set of RF amplifiers of the plurality of RF amplifiers; and an antenna structure including a plurality of antenna elements each coupled to an output of one of the plurality of RF amplifiers. The first signal can be conveyed through the first set of transmission paths and the second signal is conveyed through the second set of transmission paths.

The first phase shifter can be connected between the first hybrid coupler and the third hybrid coupler. The first phase shifter can be connected between the third hybrid coupler and an RF amplifier of the second set of RF amplifiers. The first set of transmission paths can include a second phase shifter.

The second phase shifter can be connected between the second hybrid coupler and a first RF amplifier of the first set of RF amplifiers, and the first phase shifter is connected between the third hybrid coupler and a second RF amplifier of the second set of RF amplifiers. The first phase shifter and the second phase shifter can each be configured to transition between a plurality of phase shift states, each phase shift state corresponding to a different polarization of high-power microwaves emitted by the antenna structure. The first hybrid coupler can be a different type of hybrid coupler than the second hybrid coupler and the third hybrid coupler. The plurality of antenna elements can include a first pair of antenna elements extending in opposite first directions; and a second pair of antenna elements extending in opposite second directions, the second pair of antenna elements arranged transversely to the first pair of antenna elements.

Embodiments of the present disclosure include phased array systems that can include an RF signal generator configured to generate a first plurality of RF signals; a plurality of electronic systems each coupled to the RF signal generator to receive an RF signal of the first plurality of RF signals and each configured to emit a plurality of amplified RF signals, each of the plurality of electronic systems including a phase shifter configured to selectively transition between a plurality of states; an antenna array including a plurality of antenna structures coupled to outputs of the plurality of electronic systems; and a control system including one or more processors and memory storing instructions that, as a result of execution by the one or more processors, cause the control system to determine a set of waveform parameters including a selected polarization of an RF beam to be formed, and control the phase shifters of the electronic systems to cause the antenna structures to emit the RF beam having the selected polarization.

Execution of the instructions by the one or more processors can cause the control system to determine an elevation of the RF beam to be formed and an azimuth of the RF beam to be formed, and control the RF signal generator to adjust relative phases of the first plurality of RF signals according to the azimuth and elevation.

Each antenna structure can include a plurality of antenna elements that includes a first pair of antenna elements extending in opposite first directions; a second pair of antenna elements extending in opposite second directions, the second pair of antenna elements arranged transversely to the first pair of antenna elements; and a plurality of feedlines each coupled to one of the plurality of antenna elements.

The phase shifters can be two-state phase shifters that transition between a first state in which an output of the phase shifter is not phase shifted and a second state in which the output of the phase shifter is phase shifted by 180°. The phase shifters can be four-state phase shifters that transition between a plurality of states including a first state in which an output of the phase shifter is not phase shifted, a second state in which the output of the phase shifter is phase shifted by 90°, a third state in which the output of the phase shifter is phase shifted by 180°, and a fourth state in which the output of the phase shifter is phase shifted by 270°.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations.

DETAILED DESCRIPTION

The present disclosure provides examples of antennas, radio frequency systems, and methods. More specifically, the present disclosure provides multiport antenna structures to combine a plurality of RF signals. The present disclosure also enables selective polarization of high-power microwaves emitted by a multiport antenna structure.

The term "set," as used herein (e.g., a set of keys), refers to a non-empty collection of members. The phrase "coupled to," as used herein and unless otherwise indicated by the context of the usage, means that a first circuit element is coupled to a second circuit element, with or without intervening elements therebetween. The term "subset," as used herein, refers to a proper subset unless otherwise indicated.

Figure 1:
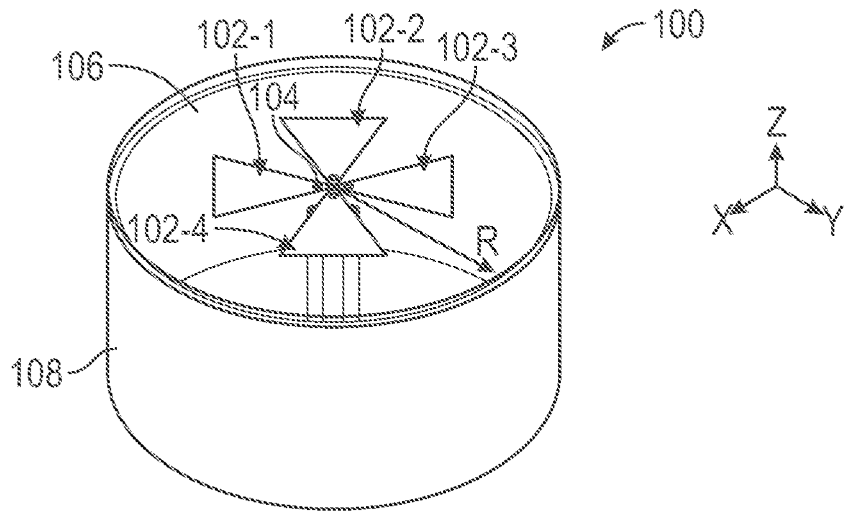
FIG. 1 illustrates a top perspective view of a first multiport antenna structure according to one or more embodiments.

FIG. 1 illustrates a top perspective view of a multiport antenna structure 100 according to one or more embodiments. The antenna structure 100 includes a plurality of antenna elements 102-1, 102-2, 102-3, and 102-4 (collectively "antenna elements 102") arranged about an axis Z extending through a center of the antenna structure 100. Each of the antenna elements 102 is comprised of an electrically conductive material, such as aluminum, copper, gold, or an alloy thereof. The antenna elements 102 are spaced apart from each other in a circumferential direction of the antenna structure 100. The antenna elements 102 are also electrically isolated from each other on the antenna structure 100. The antenna structure 100 is a high-power microwave antenna in at least some embodiments.

Each of the antenna elements 102 has a triangular shape with a vertex of the triangular shape provided adjacent to the axis Z. Opposite pairs of the antenna elements 102 may be positioned in a bowtie configuration. For instance, as shown, the antenna elements 102-1 and 102-3 are positioned in a first bowtie configuration and the antenna elements 102-2 and 102-4 are positioned in a second bowtie configuration arranged transverse to the first bowtie configuration. In some embodiments, the triangular shapes are isosceles triangle shapes with a base of the isosceles triangle shape located distally relative to the center of the arrangement of antenna elements 102. In some embodiments, the triangular shapes are equilateral triangle shapes or right triangle shapes.

The antenna elements 102 may have a shape other than triangular in some embodiments. By way of non-limiting example, the antenna elements 102 may have a circular shape with a peripheral edge adjacent to the axis Z. In some embodiments, the circular shape may be an elliptical shape having a major axis extending in a radial direction R. As another non-limiting example, the antenna elements 102 may have a rectangular shape with a length extending in the radial direction R. The antenna elements 102 may have a quadrilateral shape in some embodiments.

Each of the antenna elements 102 has an electrical connection 104 to a conductor that conveys a radio frequency signal. The antenna elements 102 are provided on a surface of or embedded within a substrate 106. The substrate 106 is a dielectric or electrically insulating material, such as a polymer (e.g., resin, polyimide), silicon, or ceramics, by way of non-limiting example. The substrate 106 has a circular shape in the antenna structure 100; however, the substrate 106 may have other shapes (e.g., rectangular) without departing from the scope of the present disclosure. In some embodiments, the substrate 106 may include a plurality of the antenna elements 102. The antenna structure 100 includes a housing 108 to which the substrate 106 is attached. The housing 108 has a cylindrical shape extending along the Z axis direction; however, the housing 108 may have a different shape without departing from the scope of the present disclosure. The housing 108 may contain electrical components and/or electrical systems in some embodiments.

Figure 2:
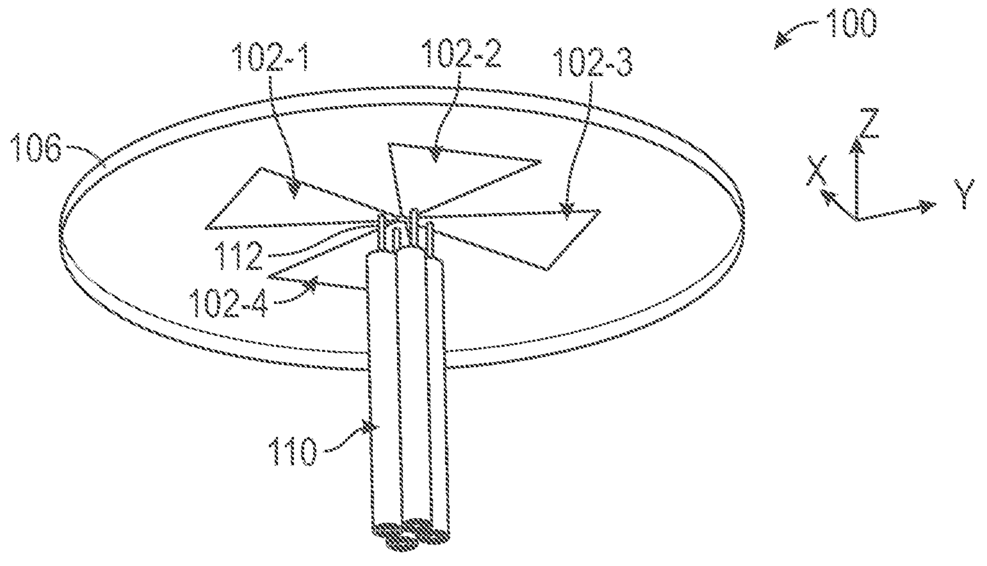
FIG. 2 illustrates a bottom perspective view of the multiport antenna structure of FIG. 1 according to one or more embodiments.

FIG. 2 illustrates a bottom perspective view of the antenna structure 100 according to one or more embodiments. In the bottom perspective view of the antenna structure 100, the housing 108 is removed for visibility and discussion purposes. The antenna structure 100 includes a plurality of feed lines 110 each connected to one of the antenna elements 102. Each feed line 110 includes a conductor 112 terminating at one of the connections 104 (see FIG. 1). The feed lines 110, in some embodiments, are coaxial cables including a dielectric insulator surrounding the conductors 112 and a shielding layer covering the dielectric insulator. Providing an RF signal input to each of the antenna elements 102 enables greater control of high-power microwave polarization and also enables greater power output relative to antenna structures with fewer signal inputs. In operation, the four feedlines 110 are equally excited in terms of RF signal amplitude.

Figure 3:
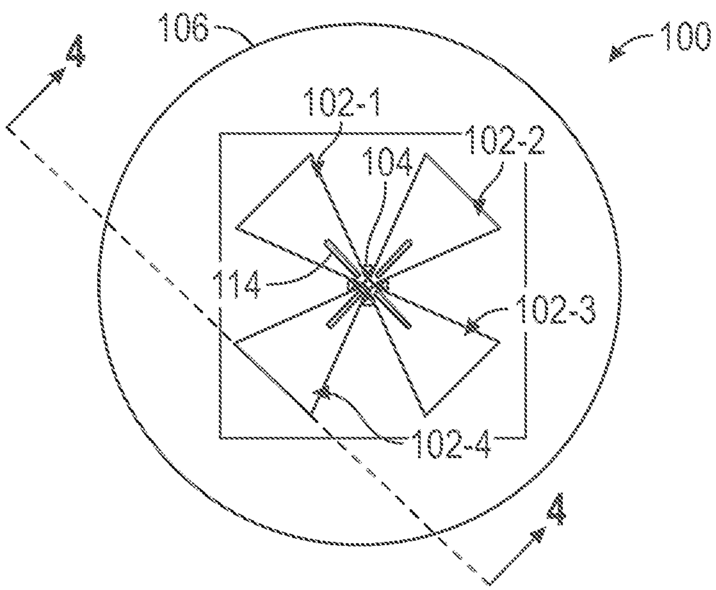
FIG. 3 illustrates a top view of the multiport antenna structure of FIG. 1 according to one or more embodiments.

FIG. 3 shows a top view of the antenna structure 100 according to one or more embodiments. In some embodiments, the antenna structure 100 includes a conductor 114 extending along a surface of one or more of the antenna elements 102. Each conductor 114 extends from the connection 104 in a radial or outward direction relative to the center of the antenna structure 100. Each conductor 114 may be mechanically and electrically coupled to the antenna elements 102 via solder, electrically conductive paste, or electrically conductive epoxy, by way of non-limiting example. The conductors 114 may increase current flow through the antenna element 102 to which they are coupled.

Figure 4:
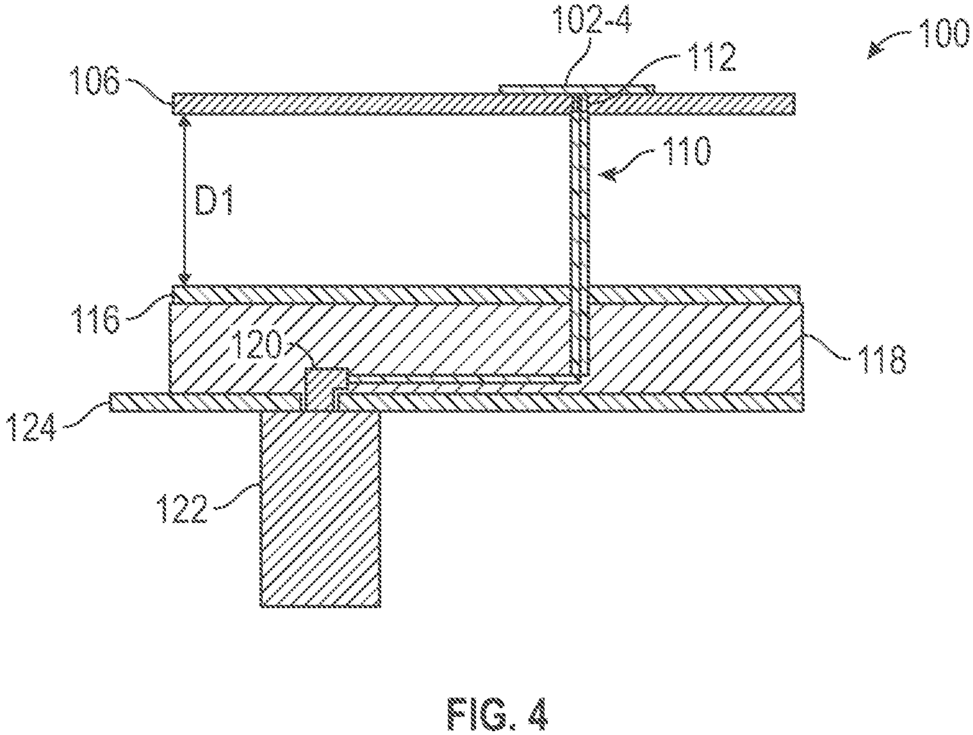
FIG. 4 illustrates a cross-sectional side view of the multiport antenna structure of FIG. 1 according to one or more embodiments.

FIG. 4 illustrates a cross-sectional view of the antenna structure taken along the through line A-A in FIG. 3 according to one or more embodiments. As shown, the antenna elements 102 are located on an upper surface of the substrate 106. The antenna elements 102 may be printed on the substrate 106, e.g., via photolithographic techniques on the substrate 106. The antenna structure 100 includes a conductive antenna ground plane 116 spaced apart from the substrate 106 at a distance D1. The distance D1, in some embodiments, is approximately k/4, where k is a wavelength of the electromagnetic radiation to be emitted from the antenna structure 100.

The antenna structure 100 may include a guide 118 through which the feed lines 110 pass to couple to the antenna elements 102. The guide 118 may include a conduit formed through a solid material, such as a plastic or polymer. The feed lines 110 terminate at one or more ports or connectors 120, which are coupled to one or more electronic systems 122 described herein. The one or more ports 120 may be DIN connectors, MBX connectors, microcoaxial (MCX) connectors, QN connectors, or subminiature connectors (e.g., SMB, SMC, SMP), by way of non-limiting example. The antenna structure 100 may include a chassis 124 having an aperture through which the feed lines 110 extend to couple with the one or more electronic systems 122.

Figure 5:
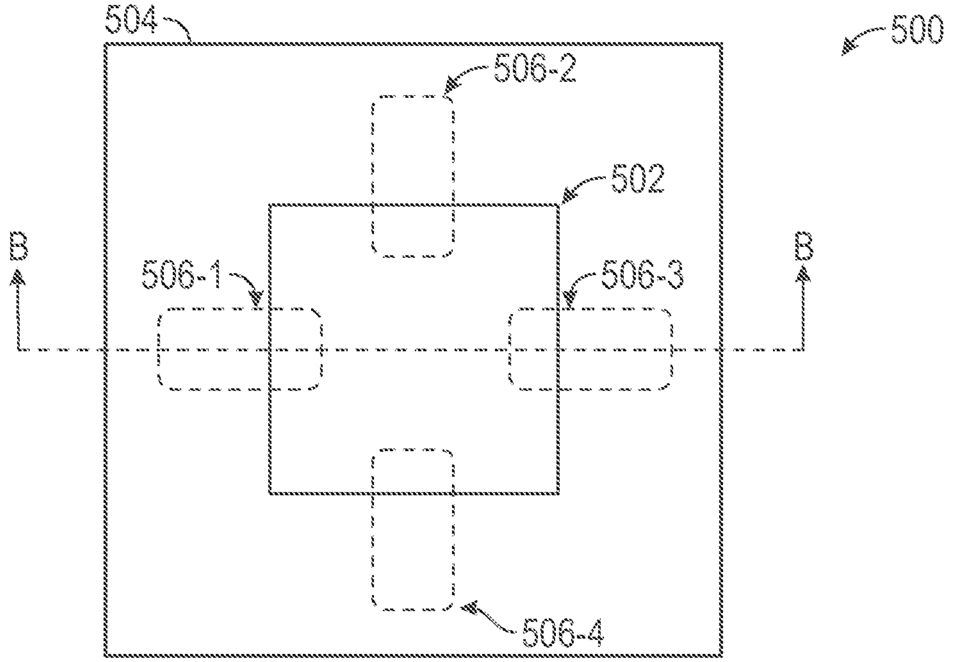
FIG. 5 illustrates a top view of a second multiport antenna structure according to one or more embodiments.

FIG. 5 illustrates a top view of a multiport antenna structure 500 according to one or more embodiments. The antenna structure 500 is a high-power microwave patch antenna in some embodiments. The antenna structure 500 includes a patch 502 of planar conductive material positioned on a substrate 504 of dielectric material. The conductive material may be a metal, such as copper, aluminum, gold, or an alloy thereof, by way of non-limiting example.

The patch 502 has a symmetrical shape arranged around a central portion of the antenna structure 500. The patch 502 has a square shape, as shown; however, the patch 502 may have a circular shape or a quadrilateral shape in some embodiments.

The antenna structure 500 also includes a plurality of microstrip lines 506-1, 506-2, 506-3, and 506-4 (collectively "microstrip lines 506) of planar conductive material. Each of the microstrip lines 506 has a first portion 508 that overlaps with the patch 502 in a thickness direction of the antenna structure 500. Each of the microstrip lines 506 has a second portion 510 that does not overlap with the patch 502 in a thickness direction of the antenna structure 500. A first set of the microstrip lines 506 (e.g., patches 506-1, 506-3) extend and are spaced apart from each other along a first direction of the antenna structure 500 (e.g., a width direction). A second set of the microstrip lines 506 (e.g., patches 506-2, 506-4) extend and are spaced apart from each other along a second direction of the antenna structure 500 (e.g., a length direction). The first set of the microstrip lines 506 is arranged transversely to the second set of the microstrip lines 506.

Figure 6:
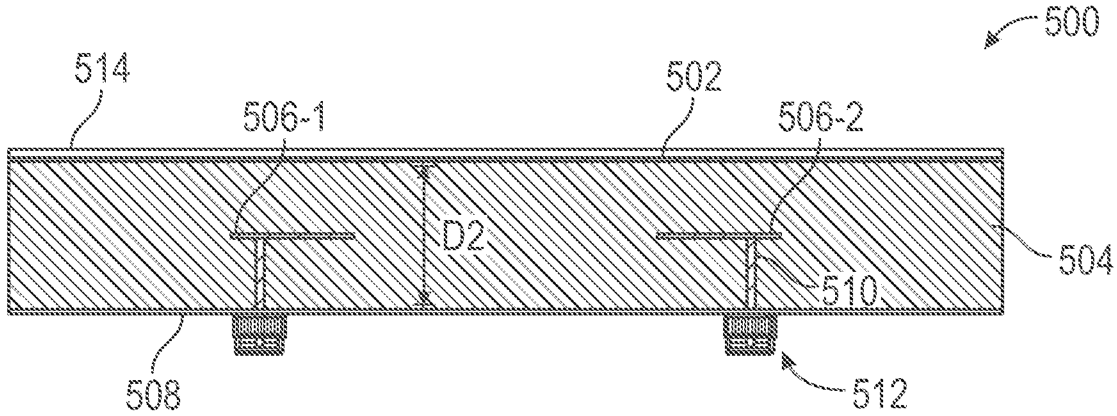
FIG. 6 illustrates a cross-sectional side view of the multiport antenna structure of FIG. 5 according to one or more embodiments.

FIG. 6 illustrates a cross-sectional view of the antenna structure 500 taken along the line B-B according to one or more embodiments. As shown, the microstrip lines 506 are spaced apart from the patch 502 in a thickness direction of the antenna structure 500. A portion of the microstrip lines 506 overlap the patch 502 in the thickness direction of the antenna structure 500. The microstrip lines 506 are capacitively coupled to the patch 502 to emit electromagnetic radiation from the antenna structure 500.

The antenna structure 500 includes an antenna ground plane 508 provided on a bottom of the antenna structure 500. The ground plane 508 is spaced apart from the patch 502 at a distance D2. The distance D2 is approximately 0.1% of the wavelength k of the electromagnetic radiation to be emitted from the antenna structure 500 in some embodiments. The antenna structure 500 includes a plurality of feed lines 510 for conveying radio frequency (RF) signals to the microstrip lines 506. Each pair of the feed lines 510 and the microstrip lines 506 collectively form L-shaped feed line for the antenna structure 500. The antenna structure 500 includes a plurality of ports or connectors 512 for coupling the microstrip lines 506 to one or more electronic systems. A portion of the ports 512 may be electrically coupled to the ground plane 508. The antenna structure 500 may include a layer 514 of dielectric material covering an upper surface of the patch 502. In operation, the four feedlines 510 are equally excited in terms of RF signal amplitude received.

Figure 7:
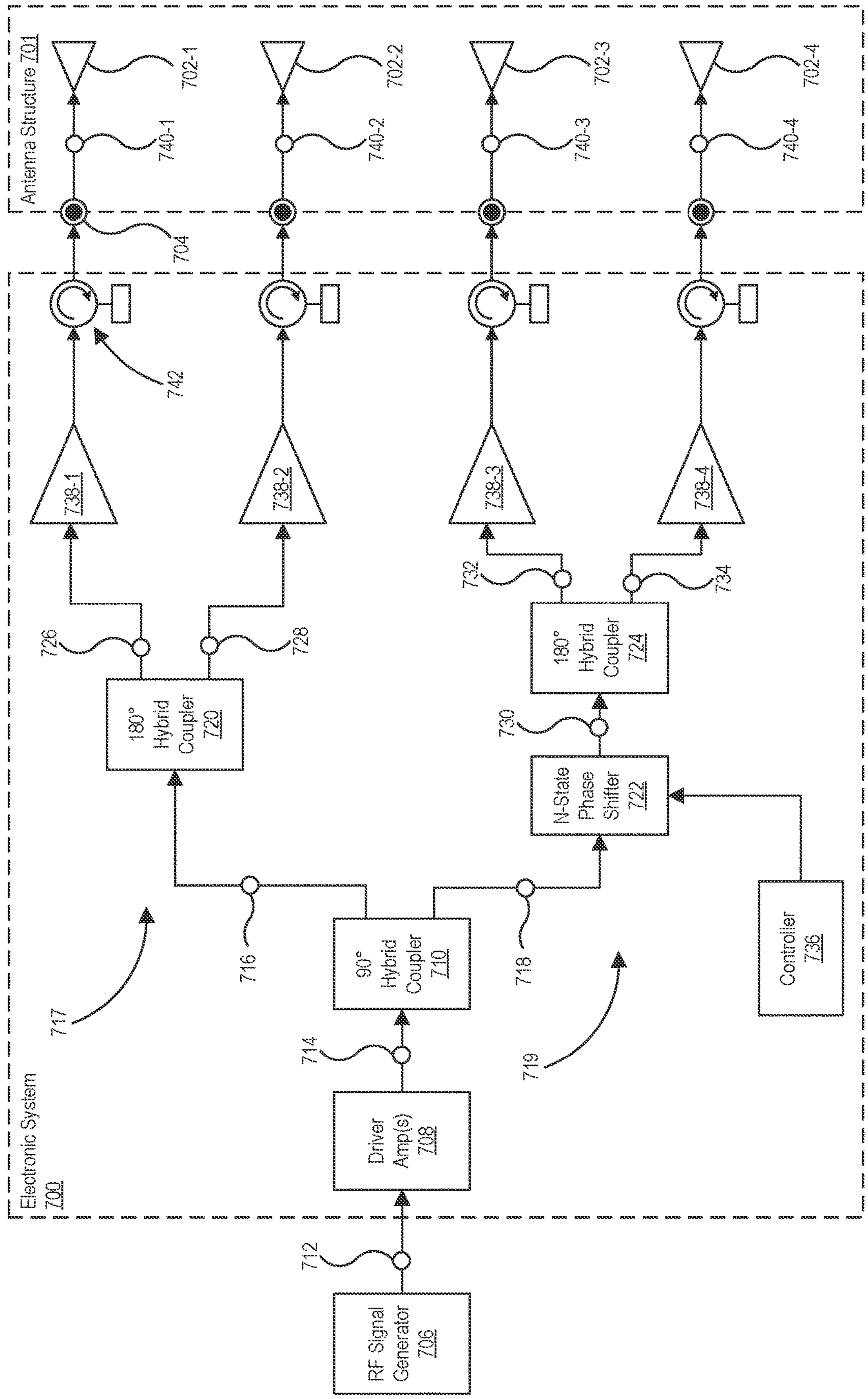
FIG. 7 illustrates a simplified block diagram of a first electronic system coupled to an antenna structure according to one or more embodiments.

FIG. 7 illustrates a first simplified block diagram of an electronic system 700 according to one or more embodiments. The electronic system 700 is electrically coupled to an antenna structure 701 via one or more ports 704. The antenna structure 701 may correspond to the antenna structure 100 or the antenna structure 500 respectively described herein. The electronic system 700, in combination with the antenna structure 701, enables selective emission of high-power microwaves having a selected polarization from among a plurality of polarizations. More particularly, the electronic system 700 may be controlled to generate high-power microwaves having a horizontal polarization, a vertical polarization, a left-hand circular polarization, and/or a right-hand circular polarization. The foregoing polarizations may be implemented with the antenna structure 100 having the orientation shown in FIG. 3 (relative to the horizon) or the antenna structure 500 being rotated 900 clockwise. For instance, the antenna element 102-1 corresponds to the antenna element 702-1, the antenna element 102-2 corresponds to the antenna element 702-2, and so on.

Advantageously, use of the antenna structures described herein also enables omission of power combiners in an RF system, the power combiners combining RF signals from a plurality of RF sources and feeding the combined RF signal are into a single port antenna. Instead, the systems described herein directly feed the RF signals from the plurality of RF sources into a corresponding one of the plurality of input ports of the multiport antenna and radiatively power combine the multiple signals at the output of the antenna. The multiport antenna is configured such that the active reflection at one of the plurality of input ports is minimized by destructively interfering the reflection at that input port with RF power coupled into that port from the remaining plurality of the input ports to reduce an amount of the active reflection at that port. The absence of additional power combining network eliminates size, weight, and loss restrictions.

The electronic system 700 includes an RF signal generator 706, one or more driver amplifiers 708, and a 90° hybrid coupler 710. The RF signal generator 706 is configured to generate an RF signal 712 having a defined frequency. The one or more driver amplifiers 708 are configured to amplify the RF signal 712 to a desired level to generate an amplified RF signal 714. The 90° hybrid coupler 710 receives the amplified RF signal 714 and outputs a first signal 716 from a first terminal and outputs a second signal 718 from a second terminal. The first signal 716 corresponds to the amplified RF signal 714 and the second signal 718 corresponds to the amplified RF signal 714 phase-shifted by 90°. The first signal 716 is conveyed through a first set of transmission paths 717. The second signal 718 is conveyed through a second set of transmission paths 719.

The electronic system 700 includes a 180° hybrid coupler 720, an N-bit phase shifter 722, and a 180° hybrid coupler 724. The 180° hybrid coupler 720 outputs a third signal 726 corresponding to the first signal 716 and a fourth signal 728 corresponding to the first signal 716 phase-shifted by 180°. The N-bit phase shifter 722 phase shifts the second signal 718 by a variable amount to output a fifth signal 730. The 180° hybrid coupler 724 outputs a sixth signal 732 corresponding to the fifth signal 730 and outputs a seventh signal 734 corresponding to the fifth signal 730 phase-shifted by 180°.

The electronic system 700 includes a controller 736 coupled to the N-bit phase shifter 722 and configured to control a state thereof. In some embodiments, the N-bit phase shifter 722 is a single bit phase shifter that may be controlled to transition the electronic system 700 between a horizontal polarization mode and a vertical polarization mode. In such embodiments, the two-state phase shifter 722 is controlled to emit the fifth signal 730 that is either phase-shifted by either 0° relative to the second signal 718 or by 180° relative to the second signal 718.

In some embodiments, the N-bit phase shifter 722 is a two-bit phase shifter that may be controlled to transition the electronic system 700 between a horizontal polarization mode, a vertical polarization mode, a right-hand circular polarization mode, and a left-hand circular polarization mode. In such embodiments, the four-state phase shifter 722 is controlled to emit the fifth signal 730 that is phase-shifted by 0° relative to the second signal 718, by 90° relative to the second signal 718, by 180° relative to the second signal 718, or by 270° relative to the second signal 718. The two-bit phase shifter 722 may include first circuitry that is configured to selectively introduce a 1800 phase shift and second circuitry that is configured to introduce a 900 phase shift. The controller 736 may be a digitally controlled device configured to control the two-bit phase shifter 722 according to the following Table 1:

TABLE 1

| Control bits for Phase Shifter | | |
|---|---|---|
| Polarization State | 90° Control Bit | 180° Control Bit |
| Vertical Polarization | 0 | 0 |
| Left-Hand Circular Polarization | 1 | 0 |
| Horizontal Polarization | 0 | 1 |
| Right-Hand Circular Polarization | 1 | 1 |

The controller 736, in some embodiments, includes one or more hardware devices having circuitry that is hard-wired to perform as described herein (e.g., a microcontroller, an ASIC, an FPGA, a programmable logic device, a discrete gate or transistor logic component, a discrete hardware component, or any combination thereof). In some embodiments, the controller 736 includes an electronic processing system (e.g., a general-purpose processor, a DSP, a central processing unit (CPU), a microcontroller, any combination thereof) and memory storing logic that, as a result of execution by the electronic processing system, causes the controller 736 to perform as described herein.

The electronic system 700 further includes a plurality of RF power amplifiers 738-1, 738-2, 738-3, 738-4 (collectively "power amplifiers 738") that respectively amplify the third signal 726, the fourth signal 728, the sixth signal 732, and the seventh signal 734 to a desired range. For instance, the power amplifiers 738 may amplify the RF signals by a desired ratio of input to output (e.g., ~+20 dB). The power amplifiers 738 may be solid-state high power (e.g., 1000 W+) amplifiers that amplify RF signals in a desired frequency range. Input of the power amplifiers 738 may cause the power amplifiers 738 to operate in a desired class (e.g., Class A, Class AB). The power amplifiers 738 may include one or more wide bandgap semiconductor materials, such as Gallium Nitride or Silicon Carbide.

The power amplifiers 738-1, 738-2, 738-3, 738-4 respectively generate amplified RF signals 740-1, 740-2, 740-3, 740-4. The amplified RF signals 740-1, 740-2, 740-3, 740-4 are emitted by the antenna elements 702-1, 702-2, 702-3, and 702-4 collectively via the antenna structure 701 as electromagnetic radiation having a selected polarization. The antenna structure 701 may be a single antenna structure among a plurality of antenna structures arranged in an array comprising one or more rows and/or one or more columns. For instance, a plurality of the antenna structures 701 and associated electronic systems 700 may be arranged in an N×N or M×N array, wherein N and M are integers equal to or greater than 1. The array of electronic systems 700 coupled to the array of antenna structures 701 may be collectively controlled to operate as a phased array. In some embodiments, the array of electronic systems 700 may include a single RF signal generator that generates and provides RF signals to the electronic systems 700. During operation, the power amplifiers 738 emit amplified RF signals that are equal in RF signal amplitude. As a result, each of the antenna elements 702 is equally excited in terms of power received.

The first set of transmission paths 717 comprises a first transmission path including the power amplifier 738-1 and the antenna element 702-1 and comprises a second transmission path including the power amplifier 738-2 and the antenna element 702-2. The second set of transmission paths 719 comprises a third transmission path including the power amplifier 738-3 and the antenna element 702-3 and comprises a fourth transmission path including the power amplifier 738-4 and the antenna element 702-4.

In some embodiments, the electronic systems 700 may include a plurality of RF circulators 742 each coupled between outputs of the power amplifiers 738 and the antenna elements 702. In some embodiments, the circulators 742 help to prevent or reduce inter-antenna element 702 active reflection due to mutual coupling and intra-element active reflection due to phase and/or magnitude imbalance between each of the ports 704. The circulators 742 are three terminal devices that permit RF signals to travel and exit in a single direction between the terminals. One terminal of the circulators 742 is coupled to a high power (e.g., 500 W, 1000 W) termination node or component.

Figure 8:
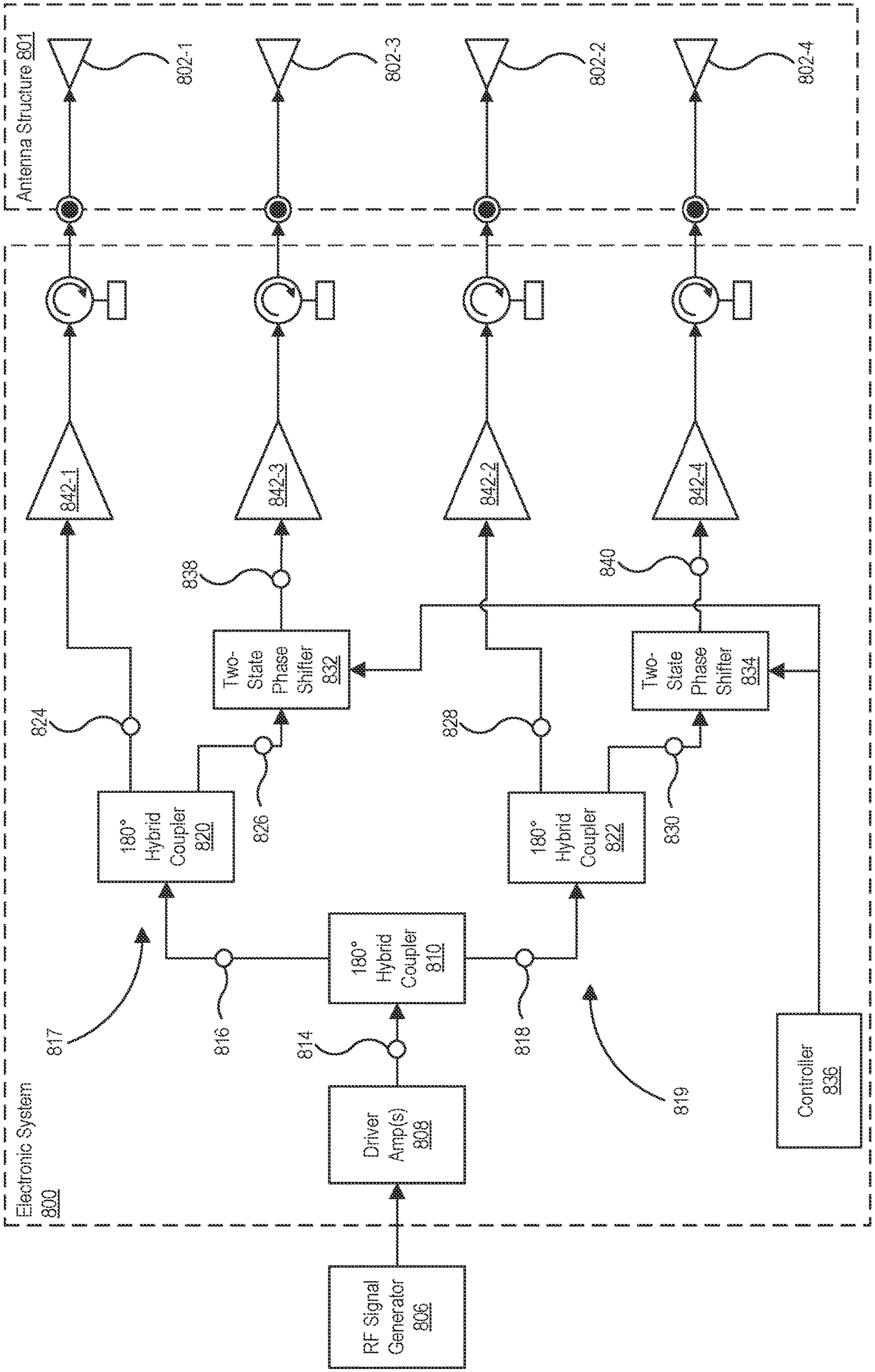
FIG. 8 illustrates a simplified block diagram of a second electronic system coupled to an antenna structure according to one or more embodiments.

FIG. 8 illustrates a second simplified block diagram of an electronic system 800 according to one or more embodiments. Various features of the electronic system 800 are substantially similar to those described with respect to the electronic system 700, so further description thereof is omitted for brevity. The electronic system 800, in combination with an antenna structure 801, enables selective emission of high-power microwaves having a selected polarization from among a plurality of polarizations. More particularly, the electronic system 800 and antenna structure 801 enable emission of high-power microwaves having either a vertical polarization or a horizontal polarization.

The electronic system 800 is coupled to an antenna structure 801 that is substantially similar to the antenna structure 701. However, outputs of the electronic system 800 (e.g., from the RF power amplifiers) are coupled to different antenna elements of the antenna structure 801 relative to connection of the electronic system 700 to the antenna structure 701.

The electronic system 800 includes an RF signal generator 806 having an output coupled to one or more driver amplifiers 808, as described with respect to the electronic system 700. The driver amplifier(s) 808 generate an amplified RF signal 814 is coupled to an input of a 1800 hybrid coupler 810. The 180° hybrid coupler 810 outputs a first signal 816 that is conveyed along a first set of transmission paths 817. The 180° hybrid coupler 810 outputs a second signal 818 that is conveyed along a second set of transmission paths 819. The first signal 816 corresponds to the amplified RF signal 814 and the second signal 816 corresponds to the amplified RF signal 814 phase-shifted by 180°.

The first signal 816 is received by a 180° hybrid coupler 820 and the second signal 818 is received by a 180° hybrid coupler 822. The 180° hybrid coupler 820 outputs a third signal 824 corresponding to the first signal 816 and outputs a fourth signal 826 corresponding to the first signal 816 phase-shifted by 180°. The 180° hybrid coupler 822 outputs a fifth signal 828 corresponding to the second signal 818 and outputs a sixth signal 830 corresponding to the second signal 818 phase-shifted by 180°.

The electronic system 800 includes a first two-state phase shifter 832 coupled to receive the fourth signal 826. The electronic system 800 also includes a second two-state phase shifter 834 coupled to receive the sixth signal 830. The first and second two-state phase shifters 832 and 834 are configured to operate in a first state in which an output thereof is not phase-shifted relative to an input. The first and second two-state phase shifters 832 and 834 are configured to operate in a second state in which an output thereof is phase-shifted relative to an input. In some embodiments, the first and second two-state phase shifters 832 and 834, during operation in the second state, emit an output that is phase-shifted by 180° relative to the input.

The electronic system 800 further includes a controller 836 coupled to and configured to control states of the first and second two-state phase shifters 832 and 834. In some embodiments, the controller 836 generates an output that collectively controls a state of the first and second two-state phase shifters 832 and 834. In some embodiments, the controller 836 generates separate outputs that individually control states of the first and second two-state phase shifters 832 and 834. An operational state of the two-state phase shifters 832 and 834 is controlled based on memory or registers thereof that include a first bit controlling whether a first phase shift (e.g., 180°) is implemented.

As a specific non-limiting example, during operation in the first state, the first and second two-state phase shifters 832 and 834 respectively emit seventh and eighth signals 838 and 840. The seventh signal 838 is phase shifted (e.g., by 180°) relative to the third signal 824 and the eighth signal 840 is phase shifted (e.g., by 180°) relative to the fourth signal 828. As a result, the third signal 824 and the eighth signal 840 are in-phase with each other (e.g., have a phase of 0°). Also, the fourth signal 828 and the seventh signal 838 are in-phase with each other (e.g., have a phase of 180°). Accordingly, the antenna structure 801 emits high-power microwaves having a first polarization (e.g., vertical polarization).

As another specific non-limiting example, during operation in the second state, the seventh signal 838 and the third signal 824 are in-phase with each other and the eighth signal 840 and the fourth signal 828 are in-phase with each other. The third and seventh signals 824 and 838 are phase-shifted (e.g., by 180°) relative to the fourth and eighth signals 828 and 840.

Accordingly, the antenna structure 801 emits high-power microwaves having a second polarization (e.g., horizontal polarization) different than the first polarization.

The third signal 824 is coupled to an input of an RF power amplifier 842-1 and the seventh signal 838 is coupled to an input of an RF power amplifier 842-3. The fourth signal 828 is coupled to an input of an RF power amplifier 842-2 and the eighth signal 840 is coupled to an input of an RF power amplifier 842-4. During operation, the power amplifiers 842 emit amplified RF signals that are equal in RF signal amplitude. As a result, each of the antenna elements 802 is equally excited in terms of power received.

Figure 9:
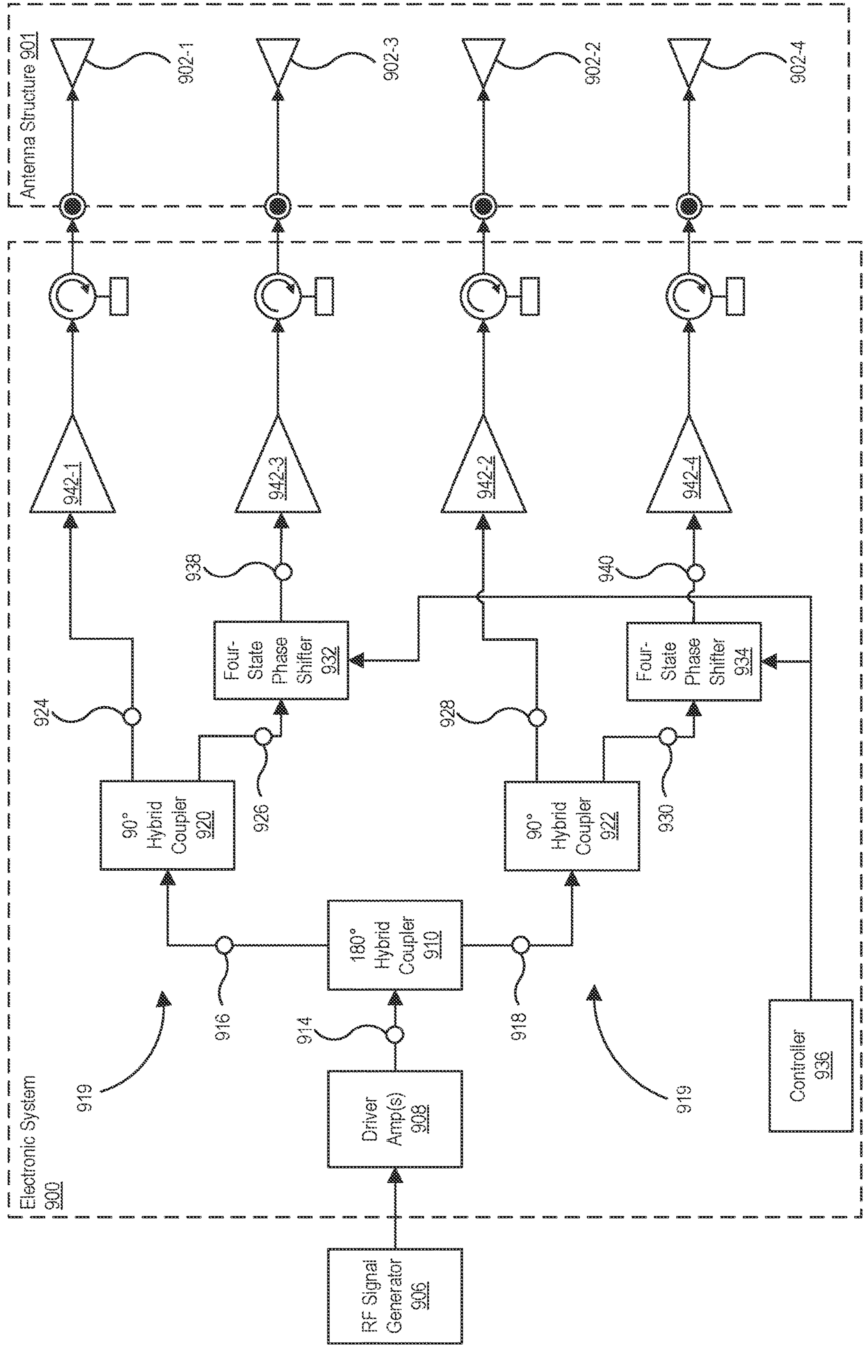
FIG. 9 illustrates a simplified block diagram of a third electronic system coupled to an antenna structure according to one or more embodiments.

FIG. 9 illustrates a third simplified block diagram of an electronic system 900 according to one or more embodiments. Various features of the electronic system 900 are substantially similar to those described with respect to the electronic systems 700 and 800, so further description thereof is omitted for brevity. The electronic system 900, in combination with an antenna structure 901, enables selective emission of high-power microwaves having a selected polarization from among a plurality of polarizations. More particularly, the electronic system 900 and the antenna structure 901 enable emission of high-power microwaves having a vertical polarization, a horizontal polarization, a right-hand circular polarization, and/or a left-hand circular polarization. The electronic system 900 is coupled to an antenna structure 901 that is substantially similar to the antenna structure 801.

The electronic system 900 includes an RF signal generator 906 having an output coupled to one or more driver amplifiers 908, as described elsewhere herein. The driver amplifier(s) 908 generate an amplified RF signal 914 is coupled to an input of a 1800 hybrid coupler 910. The 180° hybrid coupler 910 outputs a first signal 916 that is conveyed along a first set of transmission paths 917. The 180° hybrid coupler 910 outputs a second signal 918 that is conveyed along a second set of transmission paths 919. The first signal 916 corresponds to the amplified RF signal 914 and the second signal 9816 corresponds to the amplified RF signal 914 phase-shifted by 180°.

The first signal 916 is received by a 90° hybrid coupler 920 and the second signal 918 is received by a 90° hybrid coupler 922. The 90° hybrid coupler 920 outputs a third signal 924 corresponding to the first signal 916 and outputs a fourth signal 926 corresponding to the first signal 916 phase-shifted by 90°. The 90° hybrid coupler 922 outputs a fifth signal 928 corresponding to the second signal 918 and outputs a sixth signal 930 corresponding to the second signal 918 phase-shifted by 90°.

The electronic system 900 includes a first four-state phase shifter 932 coupled to receive the fourth signal 926. The electronic system 900 also includes a second four-state phase shifter 934 coupled to receive the sixth signal 930. The first and second four-state phase shifters 932 and 934 respectively emit seventh and eighth signals 938 and 940, which may output signals that are phase-shifted relative to an input thereto.

The electronic system 900 further includes a controller 936 coupled to and configured to control states of the first and second four-state phase shifters 932 and 934. In some embodiments, the controller 936 generates an output that collectively controls a state of the first and second four-state phase shifters 932 and 934. In some embodiments, the controller 936 generates separate outputs that individually control states of the first and second four-state phase shifters 932 and 934.

The first and second four-state phase shifters 932 and 934 are configured to operate, according to a first control signal from the controller 936, in a first state in which an output thereof is not phase-shifted relative to an input. As a specific non-limiting example, during operation in the first state, the seventh signal 938 is phase shifted by 90° relative to the third signal 924, the fifth signal 928 is phase shifted by 180° relative to the third signal 924, and the eighth signal 940 is phase shifted by 270° relative to the third signal 924. As a result, the antenna structure 901 emits high-power microwaves having a right-hand circular polarization.

The first and second four-state phase shifters 932 and 934 are configured to operate, according to a second control signal from the controller 936, in a second state in which an output thereof is phase-shifted by a first amount (e.g., 180°) relative to an input thereto. As a specific non-limiting example, during operation in the second state, the seventh signal 938 is phase shifted by 270° relative to the third signal 924, the fifth signal 928 is phase shifted by 180° relative to the third signal 924, and the eighth signal 940 is phase shifted by 90° relative to the third signal 924. As a result, the antenna structure 901 emits high-power microwaves having a left-hand circular polarization.

The first and second four-state phase shifters 932 and 934 are configured to operate, according to a third control signal from the controller 936, in a third state in which an output thereof is phase-shifted by a second amount (e.g., 90°) relative to an input thereto. As a specific non-limiting example, during operation in the third state, the seventh signal 938 is phase shifted by 180° relative to the third signal 924, the fifth signal 928 is phase shifted by 180° relative to the third signal 924, and the eighth signal 940 is phase shifted by 0° relative to the third signal 924. As a result, the antenna structure 901 emits high-power microwaves having a vertical polarization.

The first and second four-state phase shifters 932 and 934 are configured to operate, according to a third control signal from the controller 936, in a fourth state in which an output thereof is phase-shifted by a fourth amount (e.g., 270°) relative to an input thereto. As a specific non-limiting example, during operation in the third state, the seventh signal 938 is phase shifted by 0° relative to the third signal 924, the fifth signal 928 is phase shifted by 180° relative to the third signal 924, and the eighth signal 940 is phase shifted by 180° relative to the third signal 924. As a result, the antenna structure 901 emits high-power microwaves having a horizontal polarization.

The third signal 924 is coupled to an input of an RF power amplifier 942-1 and the seventh signal 939 is coupled to an input of an RF power amplifier 942-3. The fourth signal 929 is coupled to an input of an RF power amplifier 942-2 and the eighth signal 940 is coupled to an input of an RF power amplifier 942-4. During operation, the power amplifiers 942 emit amplified RF signals that are equal in RF signal amplitude. As a result, each of the antenna elements 902 is equally excited in terms of power received.

Operational states of the electronic system 900 relative to polarization of high-power microwaves emitted by the antenna structure 901 may be summarized according to the following Table 2 relative bit states of the four-state phase shifters 932 and 934, and the phase-shifts of the signals 938, 928, and 940 relative to the signal 924:

| Polarization | 180° bit | 90° bit | Phase-Shift of Signal 938 | Phase-Shift of Signal 928 | Phase-Shift of Signal 940 |
|---|---|---|---|---|---|
| RH Circular | 0 | 0 | 90° | 180° | 270° |
| Vertical | 0 | 1 | 180° | 180° | 0° |
| LH Circular | 1 | 0 | 270° | 180° | 90° |
| Horizontal | 1 | 1 | 0° | 180° | 180° |

Those skilled in the art will appreciate that the electronic systems and associated antenna structures may be modified to achieve different or greater scopes of polarization. For instance, the number of antenna elements and/or feeds may be increased to eight to enable diagonal polarizations in addition to those described herein. The electronic system may be modified accordingly by increasing the number of transmission paths and adjusting the amounts of phase shifting associated with each bit state of the phase shifters.

Figure 10:
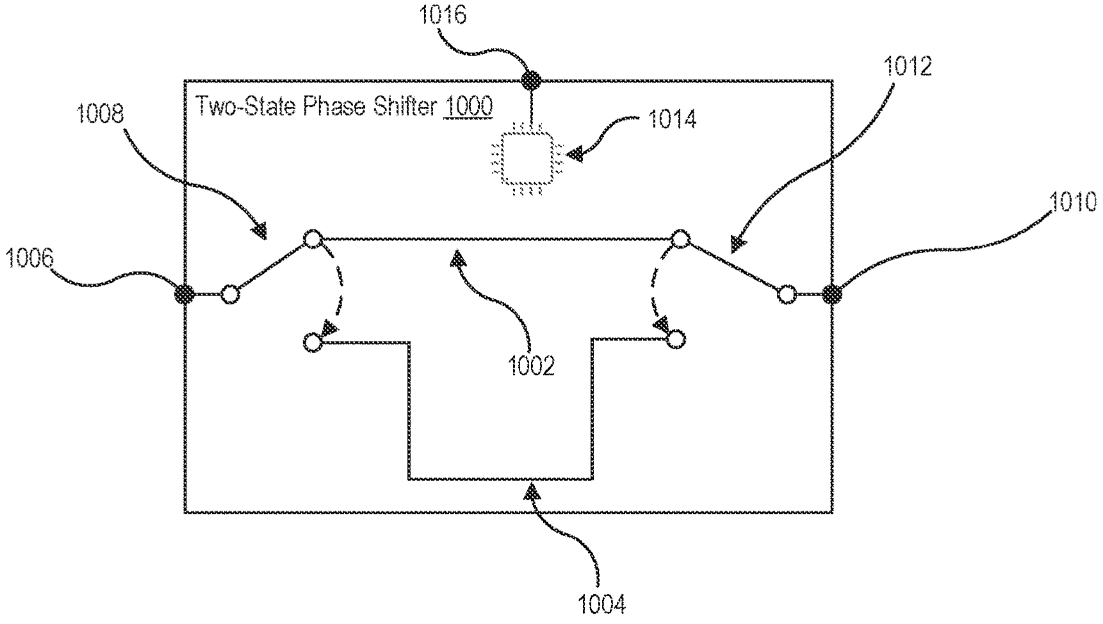
FIG. 10 illustrates a two-state phase shifter according to one or more embodiments.

FIG. 10 illustrates a two-state phase shifter 1000 according to one or more embodiments. The two-state phase shifter 1000 may be implemented, for example, in the electronic system 800. The phase shifter 1000 shown is a switched line phase shifter but may be implemented in a variety of other ways as discussed below. The phase shifter 1000 includes a first RF signal path 1002, a second RF signal path 1004, a signal input 1006, a first switching device 1008, a signal output 1010, and a second switching device 1012. The first switching device 1008 is a single-pole double-throw (SPDT) switching device coupled between the signal input 1006 and the first and second signal paths 1002 and 1004. The second switching device 1012 is a SPDT switching device coupled between the signal output 1010 and the first and second signal paths 1002 and 1004. The SPDT switching devices may be implemented using field-effect transistors (FETs), diodes, mechanical switches, or micro-electro-mechanical-system (MEMS) devices.

The first signal path 1002 has a first path length providing a first phase shift (e.g., 0°) for a given frequency or range of frequencies of a signal passed therethrough. The second signal path 1002 has a second path length providing a second phase shift (e.g., 90°, 180°) for the given frequency or range of frequencies of a signal passed therethrough. The first and second switching devices 1008 and 1012 collectively switch between connection to the first and second signal paths 1002 and 1004.

The phase shifter 1000 includes control circuitry or logic 1014 (e.g., Boolean logic, TTL) and a control input terminal 1016 for receiving a signal (e.g., analog signal, digital signal) to control a signal path state of the phase shifter 1000. The phase shifter 1000 is an example of one implementation of a two-state phase shifter 1000, which may be implemented in a variety of other ways. For instance, the two-state phase shifter 1000 may be implemented as a high-pass/low-pass phase shifter or a passive reciprocal phase shifter, by way of non-limiting example.

Figure 11:
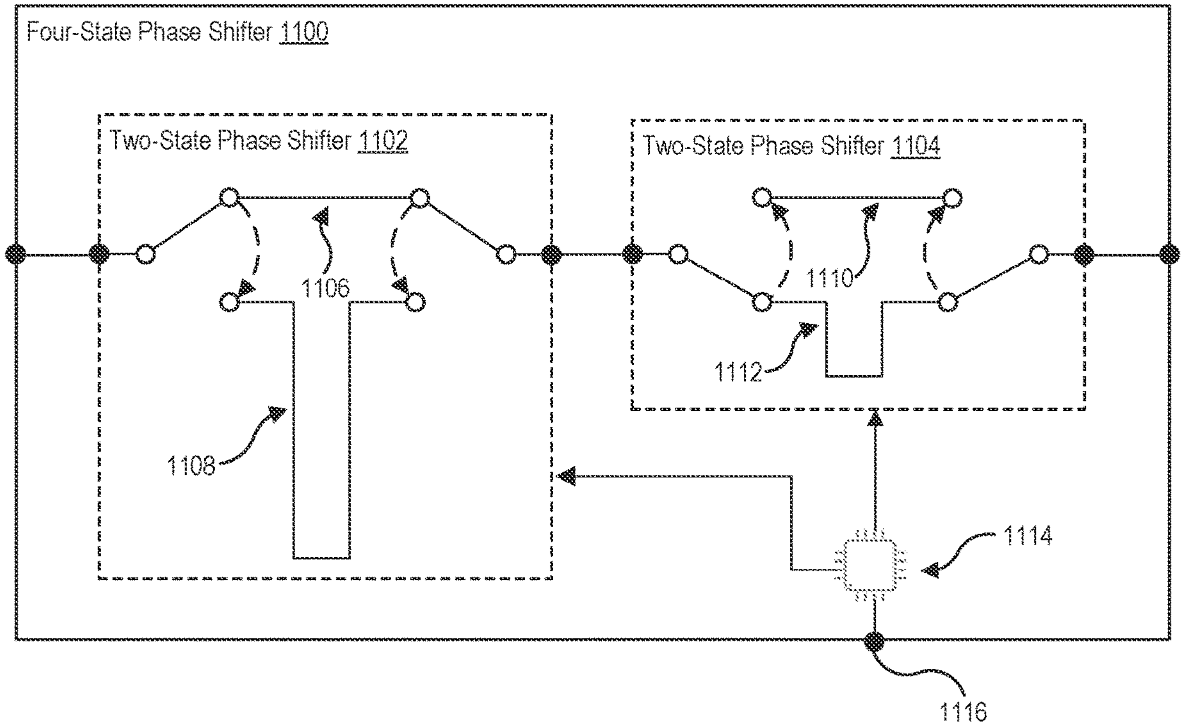
FIG. 11 illustrates a four-state phase shifter according to one or more embodiments.

FIG. 11 shows a four-state phase shifter 1100 according to one or more embodiments.

The four-state phase shifter 1100 may be implemented, for example, in the electronic system 700 or the electronic system 900. The phase shifter 1100 shown is comprised of switched line phase shifters but may be implemented in a variety of other ways. The phase shifter 1100 includes a first two-state phase shifter 1102 and a second two-state phase shifter 1104 connected in series with the first two-state phase shifter 1102. Each of the first and second phase shifters 1102 and 1104 include a pair of SPDT switching devices that collectively transition between connection to a first signal path and a second signal path to adjust a phase shift of the signal passed therethrough.

The first phase shifter 1102 includes a first signal path 1106 having a first path length providing a first phase shift (e.g., 0°) for a given frequency or range of frequencies of a signal passed therethrough. The first phase shifter 1102 also includes a second signal path 1108 having a second path length providing a second phase shift (e.g., 180°) for a given frequency or range of frequencies of a signal passed therethrough. The second phase shifter 1104 includes a third signal path 1110 having the first path length providing the first phase shift (e.g., 0°) for a given frequency or range of frequencies of a signal passed therethrough. The second phase shifter 1104 includes a fourth signal path 1112 having a fourth path length providing a third phase shift (e.g., 90°) for a given frequency or range of frequencies of a signal passed therethrough. The second phase shift of the second signal path 1108 is different than the third phase shift of the fourth signal path 1112.

The phase shifter 1100 also includes control circuitry or logic 1114 (e.g., Boolean logic, TTL) and a set of control input terminals 1116 for receiving signals (e.g., analog signals, digital signals) to control a signal path state of the first and second phase shifters 1102 and 1104. As discussed above with respect to FIG. 10, the four-state phase shifter 1100 may be implemented using high-pass/low-pass phase shifters or passive reciprocal phase shifters, by way of non-limiting example.

Figure 12:
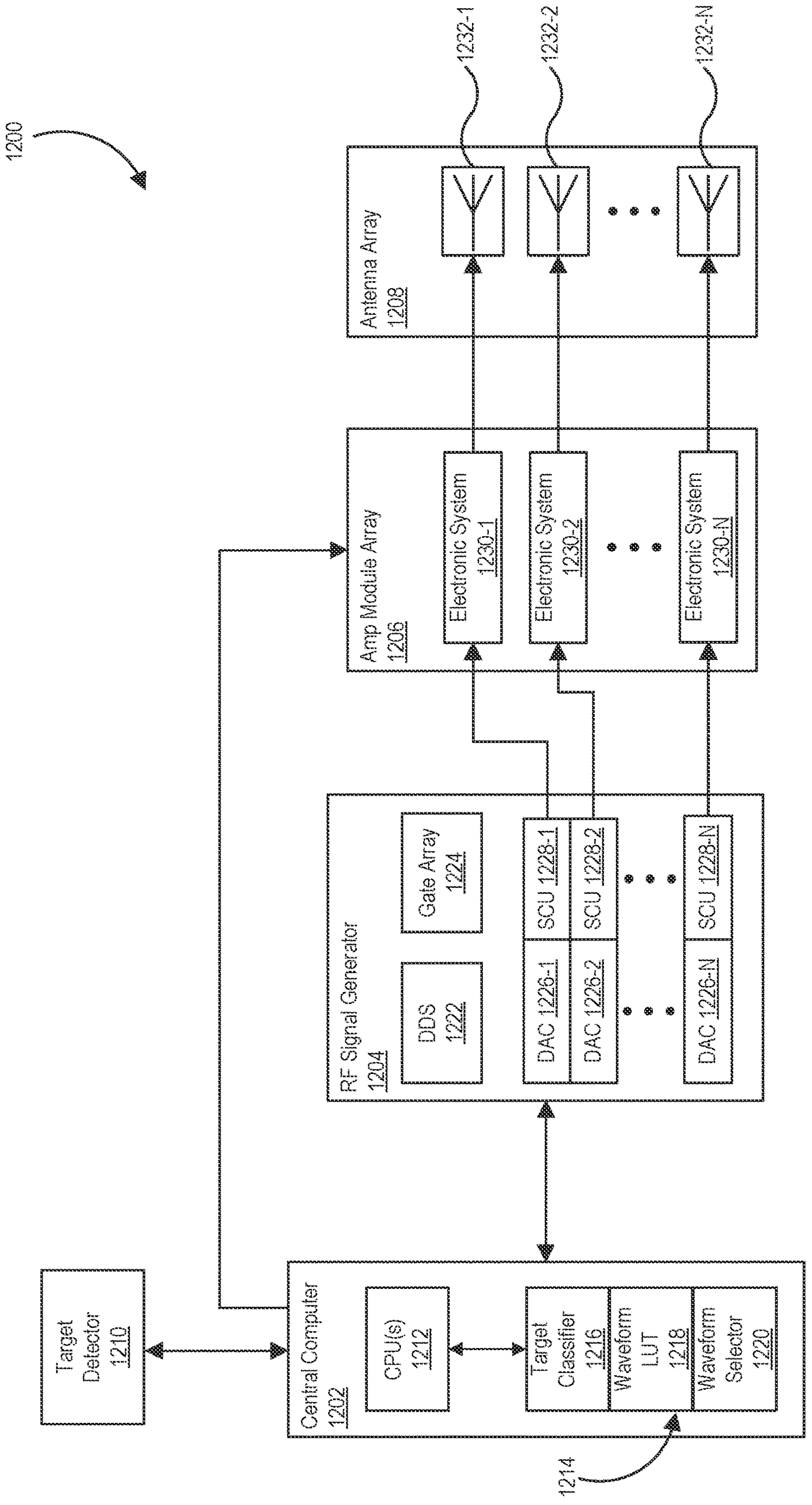
FIG. 12 illustrates a phased array system according to one or more embodiments.

FIG. 12 illustrates a simplified block diagram of a phased array system 1200 according to one or more embodiments. The phased array system 1200 includes a central computer 1202, an RF signal generator 1204, an array of amplifier modules 1206, and an antenna array 1208.

In some embodiments, the phased array system 1200 may include a target detector 1210 comprising one or more sensors (e.g., electro-optical, radar, infrared) configured to detect targets, such as unmanned aerial vehicles.

The central computer 1202 comprises one or more CPUs 1212 coupled to memory 1214. The memory 1214 may store instructions that, as a result of execution by the one or more CPUs 1212, cause the central computer 1202 to perform operations described herein. The memory 1214, for instance, may store target classification instructions 1216 that enable the one or more CPUs 1212 to classify a target detected. The memory 1214 may also store a waveform data structure 1218, such as a look up table (LUT), that specifies waveform parameters. The memory 1214 may further store waveform selector instructions 1220 that enable the one or more CPUs 1212 to select waveform parameters based on the classification of the target detected. The waveform selector instructions 1220 may access one or more locations in the waveform data structure 1218 as a result of executing the waveform selector instructions 1220.

The RF signal generator 1204, in some embodiments, is implemented as an RF system on a Chip Field Programmable Gate Array (RFSoC FPGA). The signal generator 1204 may include a direct digital synthesizer (DDS) 1222 that digitally generates a signal having a desired frequency. The DDS 1220, for instance, may create waveforms of the frequency, pulse width, pulse repetition interval and intra-pulse modulation specified by the RF frequency waveform parameters generated by the central computer 1202. The gate array 1224 is configured to perform a variety of functions including, but not limited to, determining the time intervals at which different components of an amplifier module is powered up and powered down. The digital waveforms are passed to a set of digital-to-analog (DAC) converters 1226-1, 1226-2, . . . , 1226-N (collectively "DACs 1226").

Outputs from the DACs 1226 may be provided to a set of signal conditioning units (SCUs) 1228-1, 1228-2, . . . , 1228-N (collectively "SCUs 1228"). In various implementations, the SCUs 1228 may comprise filters that filter the RF signals according to a frequency band of interest. In some implementations, the SCUs 1228 can comprise one or more phase shifters and/or attenuators that can achieve the desired azimuth and elevation angles for an RF beam to be generated. Each of the SCUs may, for instance, adjust a phase of the RF signal passed therethrough to achieve the desired azimuth and elevation angles of electromagnetic radiation to be emitted by the phased array system 1200.

The outputs from the RF signal generator 1204 are provided to the amplifier module array 1206, which includes a plurality of electronic systems 1230-1, 1230-2, . . . 1230-N (collectively "electronic systems 1230"). The electronic systems 1230 individually correspond to the electronic system 700, the electronic system 800, the electronic system 900, or variants thereof. The central computer 1202 is configured to control various aspects of the amplifier module array 1206. For instance, the central computer 1202 may transmit signals causing the electronic systems 1230 to transition to operate in a desired state among a plurality of selectable states, each of the selectable states corresponding to a desired polarization of high-power microwaves to be emitted from the antenna array 1208. The central computer 1202 may control other aspects of the amplifier module array 1208, such as causing a defined gate bias to be applied to individual RF power amplifiers of the electronic systems 1230. The electronic systems 1230 may each be contained within a separate module that includes a housing.

The antenna array 1208 comprises a plurality of antenna structures 1232-1, 1232-2, . . . 1232-N (collectively "antenna structures 1232"). The antenna structures 1232-1, 1232-2, . . . 1232-N individually correspond to the antenna structure 100 or the antenna structure 500 (see, e.g., FIG. 1, FIG. 5). Each of the electronic systems 1230 is coupled to an individual antenna structure of the antenna structures 1232. In some embodiments, the electronic systems 1230 and the antenna structures 1232 are arranged in an N×N array or an M×N array, wherein N and M are integer values. In such embodiments, each antenna structure 1232 is coupled directly to the four output ports of an individual electronic system of the electronic systems 1230.

The RF signal generator 1204 allows digital formation of signal beams which has several advantages including but not limited to increasing/maximizing signal power in certain regions of space and decreasing/minimizing signal power in certain other regions of space. Accordingly, signal power can be focused on targets in certain regions of space while reducing the signal power on targets in certain other regions of space. Digitally forming signal beams as discussed above also advantageously allow the power, frequency and other parameters of the signal beam to be changed in sufficiently real time (e.g., in less than 1 millisecond).

The central computer 1202 may be configured to classify targets (e.g., by type) and select RF waveform parameters based on the target classification. The central computer 1202 passes the RF waveform parameters to the RF signal generator 1204. The RF waveform parameters include a waveform polarization type in some embodiments. In various implementations, the RF signal generator 1204 is programmable and controlled by the computer 1202 to change various parameters of the generated RF signal including but not limited to frequency and power of the RF signal. The RF signal generator 1204 creates RF signals in accordance with the RF waveform parameters. Each RF signal has a waveform of the frequency, pulse width, pulse repetition interval, and/or intra-pulse modulation specified by the RF waveform parameters received from the central computer 1202. The frequency, pulse width, pulse repetition interval and intra-pulse modulation of the generated RF signal can be changed by the computer 1202 in real time or in substantially real time.

The RF signal generator 1204 produces RF signals for multiple channels that are applied to the electronic systems 1230. The RF signals for the multiple channels are phase shifted relative to one another in accordance with RF frequency waveform parameters. In one embodiment, the phase shifting is digitally performed within the RF signal generator 1204. Alternately, analog phase shifters may shift the RF signals prior to applying them to the electronic systems 1230. In some implementations, the amplitude of some of the RF signals for the multiple channels can be attenuated as compared to the amplitude of some other of the RF signals for the multiple channels. Although, in the illustrated implementation, the computer 1202 is distinct from the RF signal generator 1204, in various other implementations, the computer 1202 and the RF signal generator 1204 can be integrated together. Each electronic system 1230 has a plurality of solid-state power amplifiers, each of which has a gate voltage on set point derived from an automatic calibration operation. Some of the plurality of solid-state power amplifiers may be arranged serially/sequentially in some implementations. Some of the plurality of solid-state power amplifiers may be arranged in a power combining configuration. Each amplifier chain produces an amplified RF signal. In one embodiment, a few mW RF signal from the RF signal generator 1204 is amplified to a few kWs. The amplifier chain may utilize a combination of solid-state amplifiers, including silicon laterally diffused metal-oxide semiconductors, Gallium Nitride, Scandium Aluminum Nitride, Gallium Arsenide, and Indium Phosphide.

Other Variations

Features, materials, characteristics, or groups described in conjunction with a particular aspect, embodiment, or example are to be understood to be applicable to any other aspect, embodiment or example described herein unless incompatible therewith. All the features disclosed in this specification (including any accompanying claims, abstract and drawings), and/or all the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only and are not intended to limit the scope of protection.

Indeed, the novel methods and systems described herein may be embodied in a variety of other forms. Furthermore, various omissions, substitutions, and changes in the form of the methods and systems described herein may be made. Those skilled in the art will appreciate that in some embodiments, the actual steps taken in the processes disclosed and/or illustrated may differ from those shown in the figures. Depending on the embodiment, certain of the steps described above may be removed, others may be added. For example, the actual steps and/or order of steps taken in the disclosed processes may differ from those described and/or shown in the figure. Depending on the embodiment, certain of the steps described above may be removed, others may be added. For instance, the various components illustrated in the figures and/or described may be implemented as software and/or firmware on a processor, controller, ASIC, FPGA, and/or dedicated hardware. Furthermore, the features and attributes of the specific embodiments disclosed above may be combined in different ways to form additional embodiments, all of which fall within the scope of the present disclosure.

In some cases, there is provided a non-transitory computer readable medium storing instructions, which when executed by at least one computing or processing device, cause performing any of the methods as generally shown or described herein and equivalents thereof.

Any of the memory components described herein can include volatile memory, such random-access memory (RAM), dynamic random-access memory (DRAM), synchronous dynamic random-access memory (SDRAM), double data rate (DDR) memory, static random-access memory (SRAM), other volatile memory, or any combination thereof. Any of the memory components described herein can include non-volatile memory, such as magnetic storage, flash integrated circuits, read only memory (ROM), Chalcogenide random access memory (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Any user interface screens illustrated and described herein can include additional and/or alternative components. These components can include menus, lists, buttons, text boxes, labels, radio buttons, scroll bars, sliders, checkboxes, combo boxes, status bars, dialog boxes, windows, and the like. User interface screens can include additional and/or alternative information. Components can be arranged, grouped, displayed in any suitable order.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, or within less than 0.01% of the stated amount.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

The foregoing description, for purposes of explanation, used specific nomenclature to provide a thorough understanding of the disclosure. However, it will be apparent to one skilled in the art that specific details are not required in order to practice the disclosed embodiments. Thus, the foregoing descriptions of specific embodiments are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the claims as presented herein or as presented in the future and their equivalents define the scope of the protection.

The invention claimed is:

1. A system, comprising:

an electronic system comprising a plurality of solid state radio frequency (RF) amplifiers;

an antenna structure including:

a dielectric substrate;

a plurality of antenna elements extending along the dielectric substrate; and a plurality of feedlines each of which is coupled to an individual antenna element of the plurality of antenna elements, wherein an output of each of the plurality of solid state RF amplifiers is coupled an individual feedline of the plurality of feedlines; and a plurality of RF circulators each positioned between each amplifier of the plurality of solid state RF amplifiers and each feedline of the plurality of feedlines, the plurality of RF circulators configured to reduce active reflection of a plurality of input ports for the plurality of antenna elements.

2. The system of claim 1, wherein the plurality of antenna elements include:

a first pair of antenna elements extending in opposite first directions; and a second pair of antenna elements extending in opposite second directions, the second pair of antenna elements arranged transversely to the first pair of antenna elements.

3. The system of claim 2, wherein the plurality of antenna elements are bowtie antenna elements.

4. The system of claim 2, the antenna structure including:

a planar antenna element on a first side of the dielectric substrate; and a ground plane on a second side of the dielectric substrate opposite to the first side, wherein the first pair of antenna elements and the second pair of antenna elements are located within the dielectric substrate between the planar antenna element and the ground plane.

5. The system of claim 1, wherein the electronic system is configured to:

receive a radio frequency (RF) signal;

split the RF signal into a plurality of RF signals; and phase shift a subset of RF signals of the plurality of RF signals, wherein the plurality of solid state RF amplifiers amplify the plurality of RF signals.

6. The system of claim 1, the electronic system including a phase shifter configured to selectively transition between a first state and a second state, the first state corresponding to a first polarization of high-power microwaves emitted by the antenna structure, and the second state corresponding to a second polarization of high-power microwaves emitted by the antenna structure.

7. The system of claim 6, the phase shifter is configured to selectively transition between a third state and a fourth state, the third state corresponding to a third polarization of high-power microwaves emitted by the antenna structure, and the fourth state corresponding to a fourth polarization of high-power microwaves emitted by the antenna structure.

8. A system, comprising:

an electronic system configured to receive an RF signal, the electronic system including:

a first hybrid coupler that splits the RF signal into a first signal and a second signal, the second signal phase-shifted relative to the first signal;

a first set of transmission paths including a second hybrid coupler and a first set of RF amplifiers of a plurality of RF amplifiers; and a second set of transmission paths including a third hybrid coupler, a first phase shifter, and a second set of RF amplifiers of the plurality of RF amplifiers, wherein the first signal is conveyed through the first set of transmission paths and the second signal is conveyed through the second set of transmission paths;

wherein each first signal conveyed through the first set of transmission paths is input into a respective RF amplifier of the first set of RF amplifiers and each second signal conveyed through the second set of transmission paths is input into a respective RF amplifier of the second set of RF amplifiers; and an antenna structure including a plurality of antenna elements each coupled to an output of one of the plurality of RF amplifiers.

9. The system of claim 8, wherein the first phase shifter is connected between the first hybrid coupler and the third hybrid coupler.

10. The system of claim 8, wherein the first phase shifter is connected between the third hybrid coupler and an RF amplifier of the second set of RF amplifiers.

11. The system of claim 8, wherein the first set of transmission paths include a second phase shifter.

12. The system of claim 11, wherein the second phase shifter is connected between the second hybrid coupler and a first RF amplifier of the first set of RF amplifiers, and the first phase shifter is connected between the third hybrid coupler and a second RF amplifier of the second set of RF amplifiers.

13. The system of claim 11, wherein the first phase shifter and the second phase shifter are each configured to transition between a plurality of phase shift states, each phase shift state corresponding to a different polarization of high-power microwaves emitted by the antenna structure.

14. The system of claim 8, wherein the first hybrid coupler is a different type of hybrid coupler than the second hybrid coupler and the third hybrid coupler.

15. The system of claim 8, wherein the plurality of antenna elements include:

a first pair of antenna elements extending in opposite first directions; and a second pair of antenna elements extending in opposite second directions, the second pair of antenna elements arranged transversely to the first pair of antenna elements.

16. A phased array system, comprising:

an RF signal generator configured to generate a first plurality of RF signals;

a plurality of electronic systems each coupled to the RF signal generator to receive an RF signal of the first plurality of RF signals and each configured to emit a plurality of amplified RF signals, each of the plurality of electronic systems including phase shifters configured to selectively transition between a plurality of states;

an antenna array including a plurality of antenna structures coupled to outputs of the plurality of electronic systems; and a control system including one or more processors and memory storing instructions that, as a result of execution by the one or more processors, cause the control system to:

determine a set of waveform parameters including a selected polarization of an RF beam to be formed;

cause the RF signal generator to generate the RF signal of the first plurality of RF signals using the set of waveform parameters including the selected polarization; and control the phase shifters of the plurality of electronic systems based on the RF signal to cause the plurality of antenna structures to emit the RF beam having the selected polarization.

17. The phased array system of claim 16, wherein execution of the instructions by the one or more processors causes the control system to:

determine an elevation of the RF beam to be formed and an azimuth of the RF beam to be formed, and control the RF signal generator to adjust relative phases of the first plurality of RF signals according to the azimuth and the elevation.

18. The phased array system of claim 16, wherein each antenna structure comprises a plurality of antenna elements including:

a first pair of antenna elements extending in opposite first directions;

a second pair of antenna elements extending in opposite second directions, the second pair of antenna elements arranged transversely to the first pair of antenna elements; and a plurality of feedlines each coupled to one of the plurality of antenna elements.

19. The phased array system of claim 16, wherein the phase shifters are two-state phase shifters that transition between a first state in which an output of the phase shifters is not phase shifted and a second state in which the output of the phase shifters is phase shifted by 180°.

20. The phased array system of claim 16, wherein the phase shifters are four-state phase shifters that transition between a plurality of states including a first state in which an output of the phase shifters is not phase shifted, a second state in which the output of the phase shifters is phase shifted by 90°, a third state in which the output of the phase shifters is phase shifted by 180°, and a fourth state in which the output of the phase shifters is phase shifted by 270°.

21. The phased array system of claim 16, further comprising a plurality of RF circulators each positioned between each of the outputs of the plurality of electronic systems and one or more feedlines coupled to a respective antenna structure of the plurality of antenna structures, the plurality of RF circulators configured to reduce active reflection of a plurality of input ports for a plurality of antenna elements of each of the plurality of antenna structures.

22. The phased array system of claim 16, wherein each of the plurality of electronic systems comprises a plurality of RF amplifiers, wherein the phase shifters are configured to split an RF signal of the first plurality of RF signals into a plurality of phase-shifted RF signals, wherein each of the plurality of phase-shifted RF signals is input into a respective RF amplifier of the plurality of RF amplifiers.

* * * * *